Nov. 22, 1932.  A. G. OPPY  1,888,933
ANTIGRAVITY MIDDLING CHUTE ATTACHMENT FOR PNEUMATIC COAL CLEANING TABLES
Filed Jan. 30, 1930  9 Sheets-Sheet 3
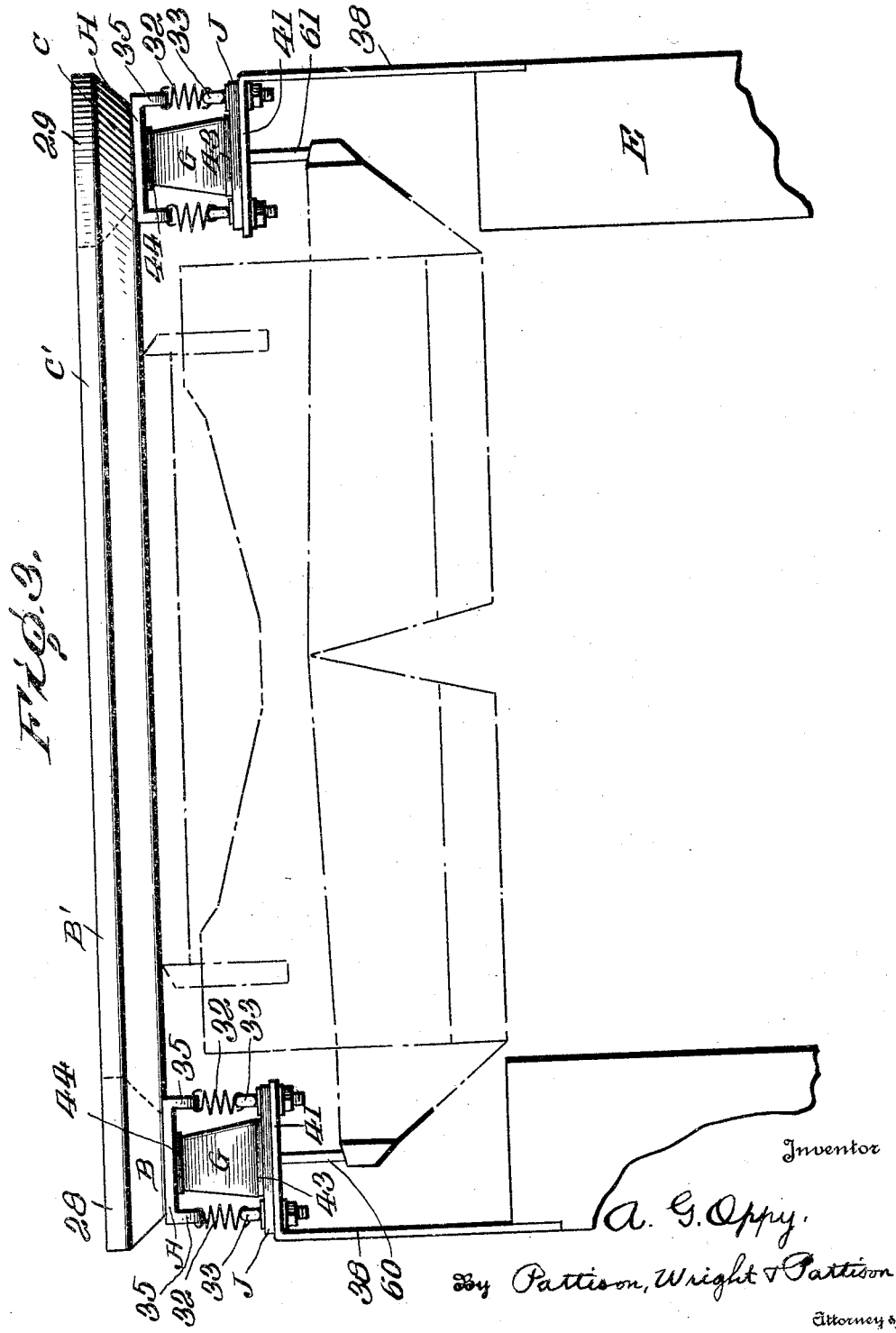
Inventor
A. G. Oppy.
By Pattison, Wright & Pattison
Attorneys Nov. 22, 1932.     A. G. OPPY     1,888,933
ANTIGRAVITY MIDDLING CHUTE ATTACHMENT FOR PNEUMATIC COAL CLEANING TABLES
Filed Jan. 30, 1930     9 Sheets-Sheet 4
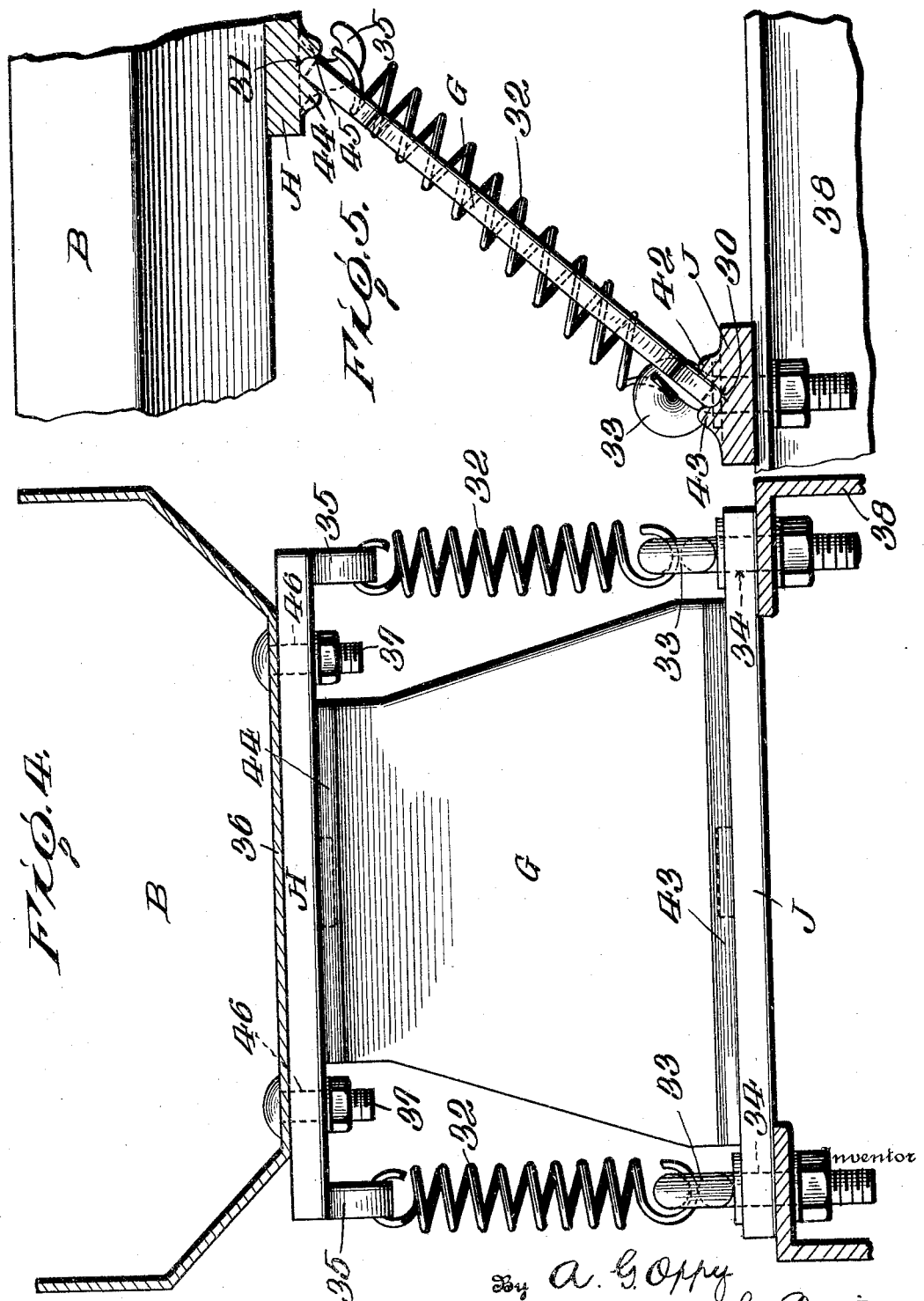

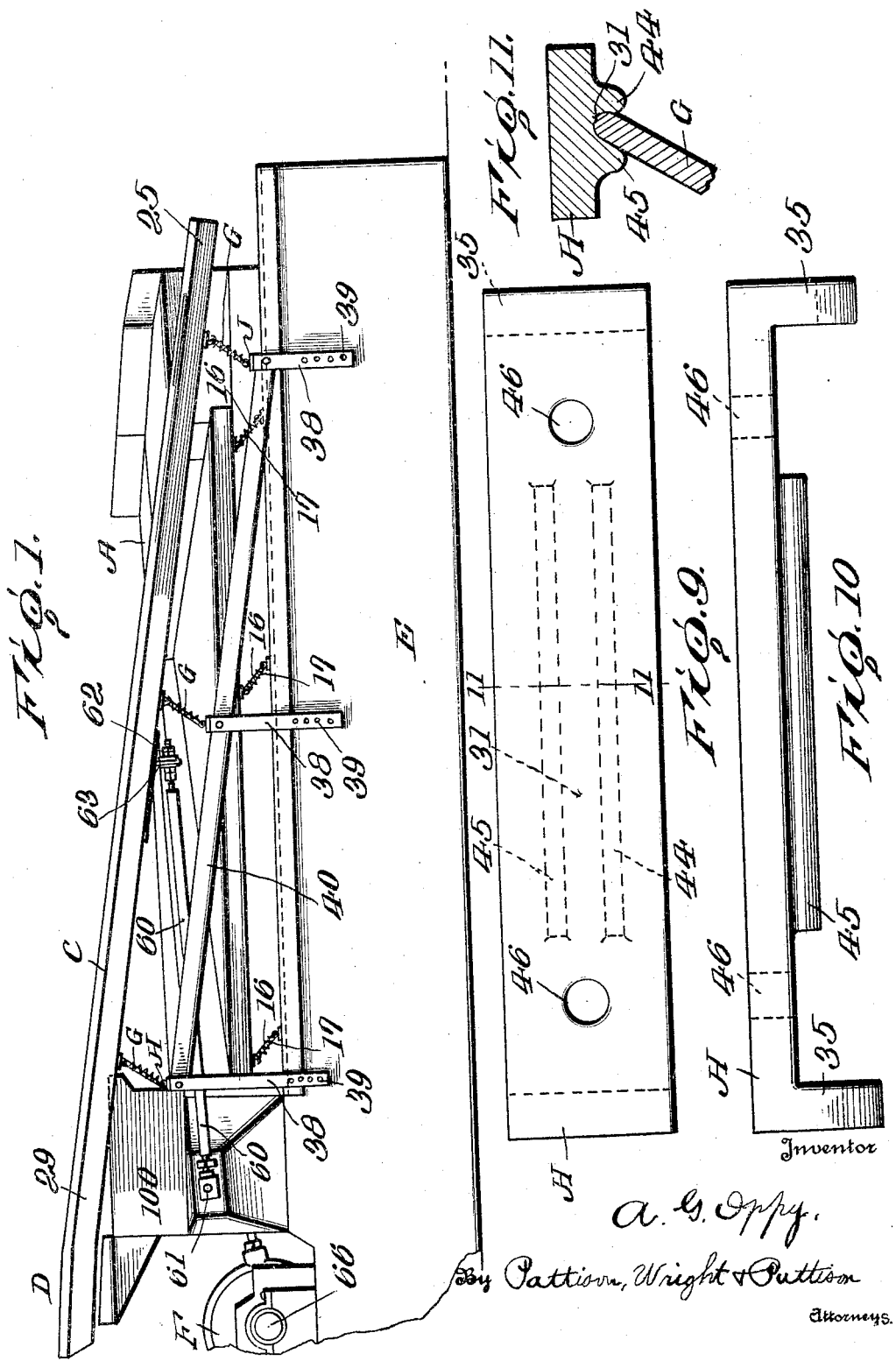

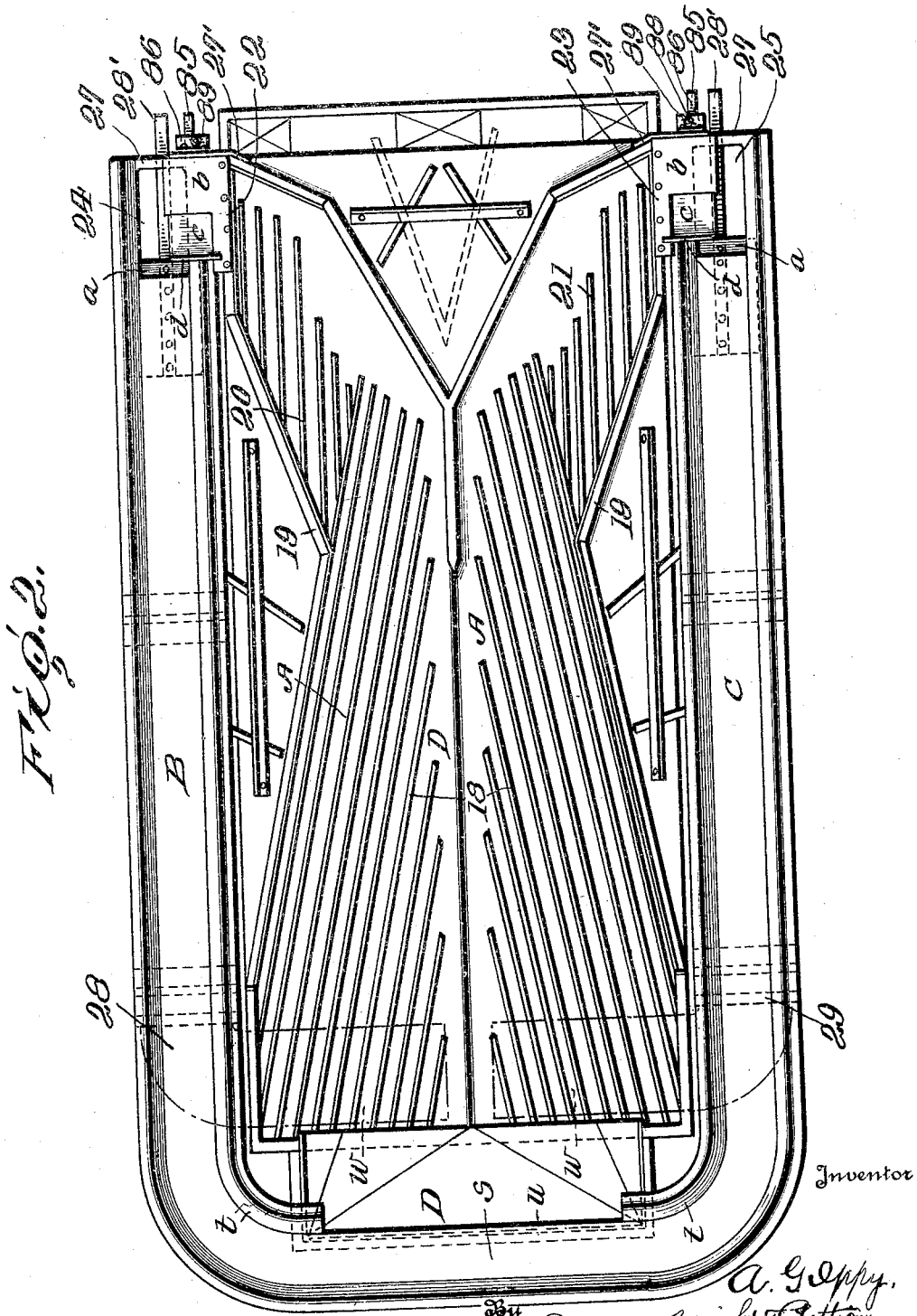

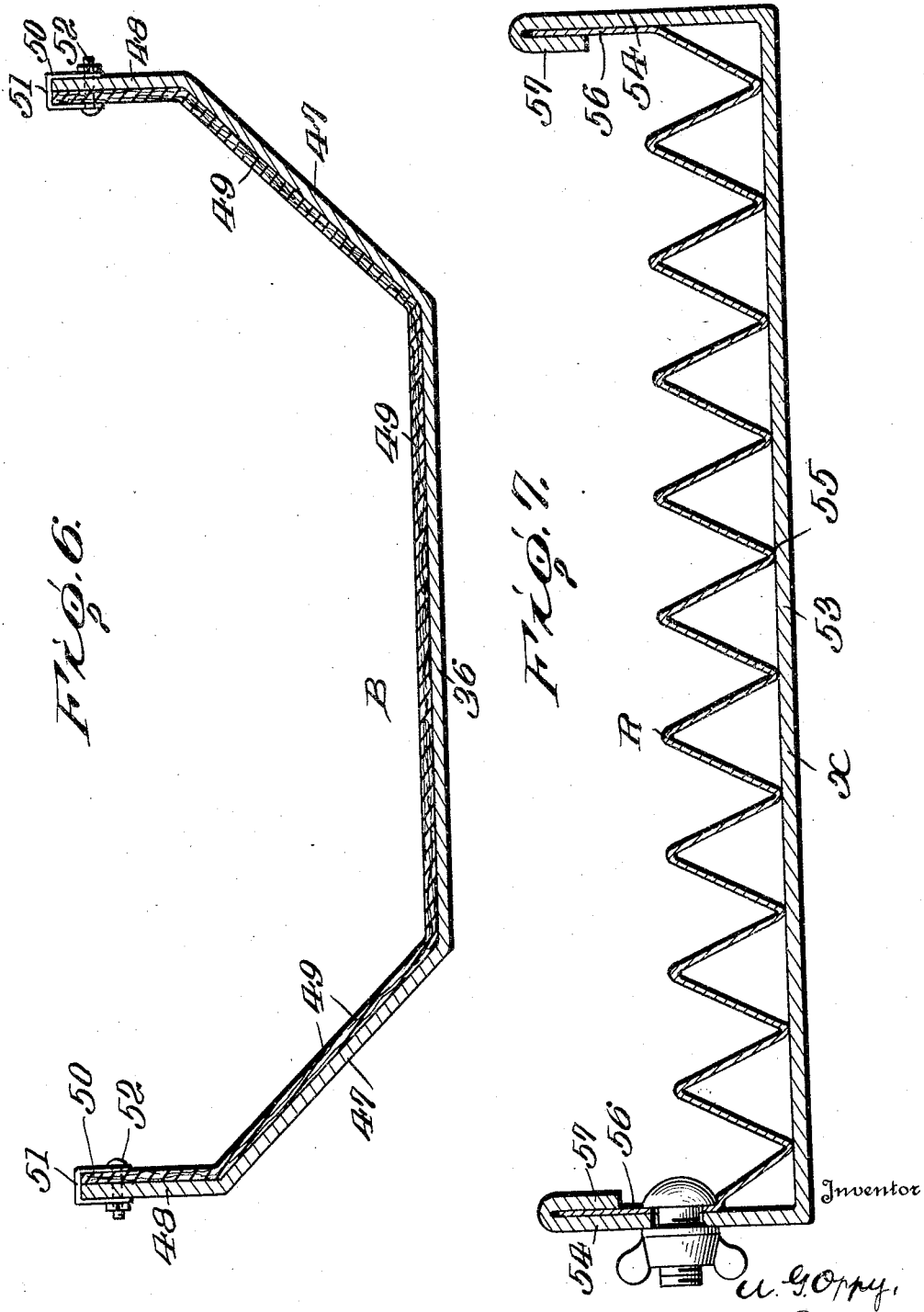

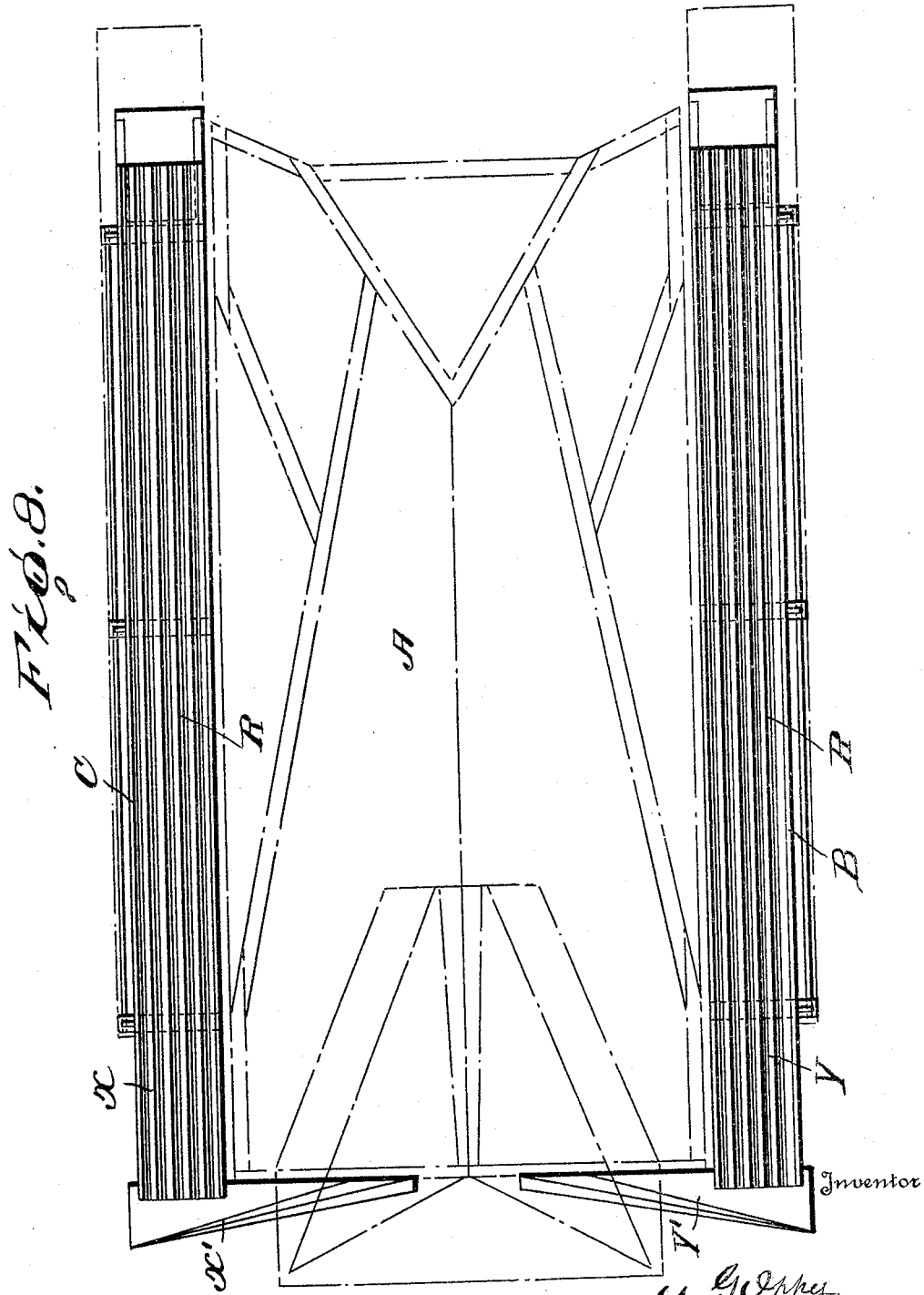

Nov. 22, 1932.  A. G. OPPY  1,888,933
ANTIGRAVITY MIDDLING CHUTE ATTACHMENT FOR PNEUMATIC COAL CLEANING TABLES
Filed Jan. 30, 1930  9 Sheets-Sheet 8
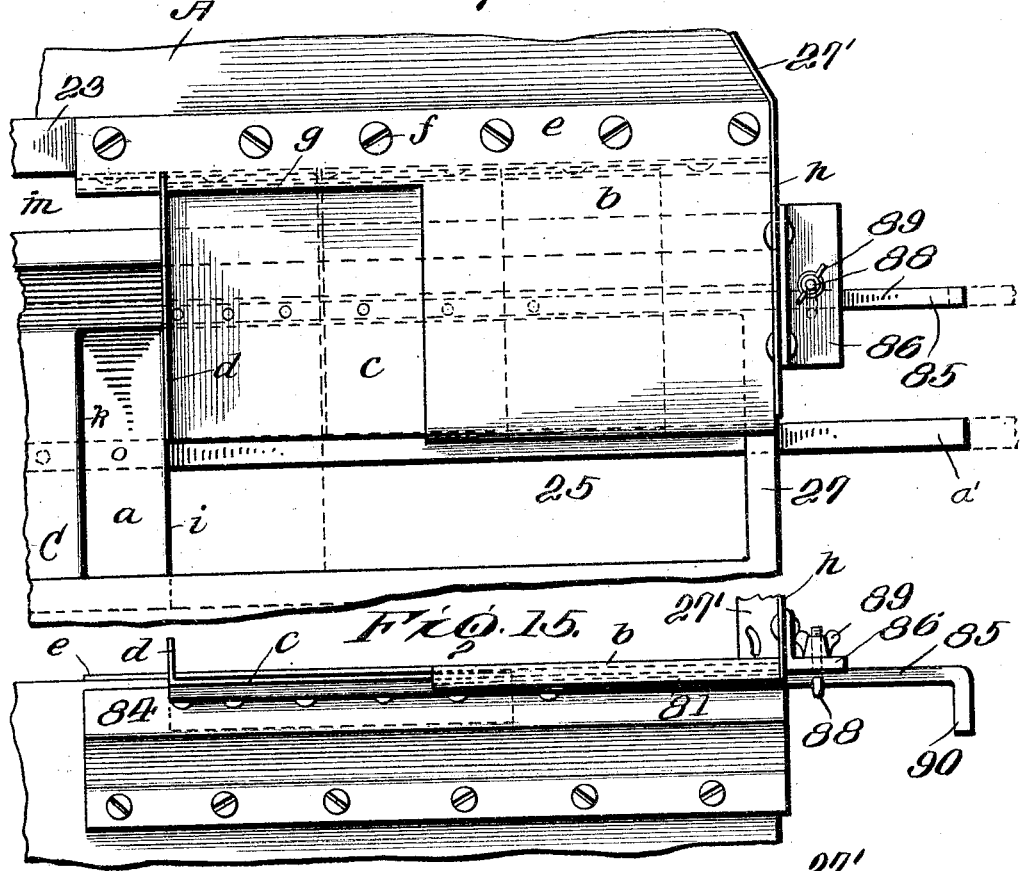
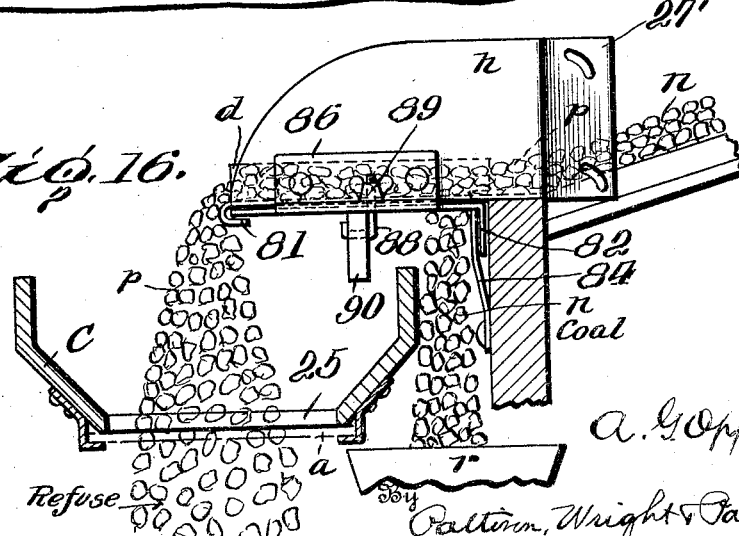

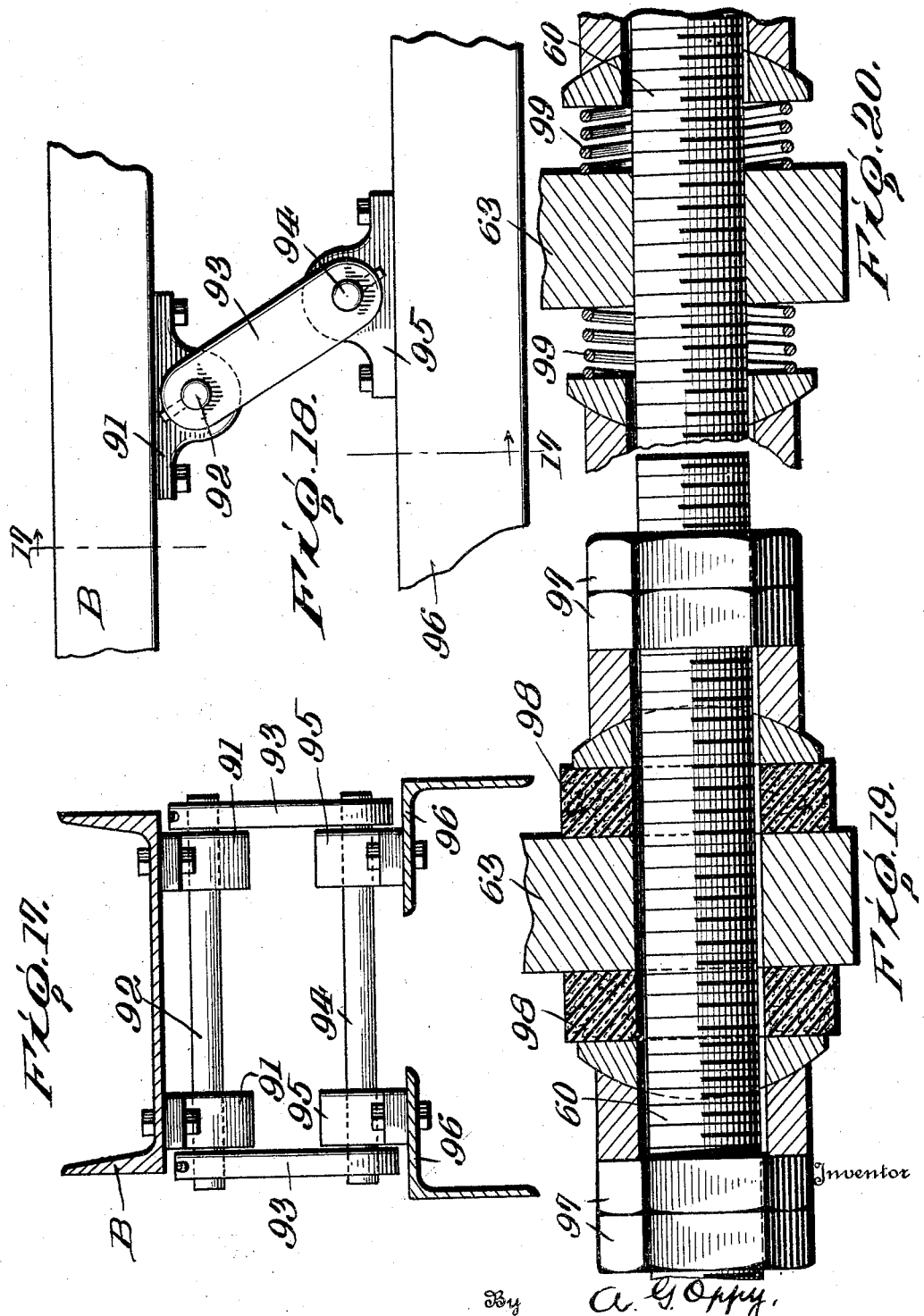

Patented Nov. 22, 1932

1,888,933

UNITED STATES PATENT OFFICE

ALWYN G. OPPY, OF WELCH, WEST VIRGINIA, ASSIGNOR TO AMERICAN COAL CLEANING CORPORATION, OF WELCH, WEST VIRGINIA, A CORPORATION OF WEST VIRGINIA

ANTIGRAVITY MIDDLING CHUTE ATTACHMENT FOR PNEUMATIC COAL CLEANING TABLES

Application filed January 30, 1930. Serial No. 424,634.

This invention relates to an anti-gravity middling chute attachment for pneumatic coal cleaning tables although it will be readily discernible from the specific description hereinafter following that the inventive principle of the device can be applied to other arts without departing from the spirit of the invention, as it will be also obvious that the device could be used for reworking or re-cleaning other materials than coal.

The primary object of the present invention is to provide an attachment for separating tables for receiving certain discharge portions thereof from the discharge end of the table and returning them to the delivery end of the table or any intermediate point between the delivery end and discharge end to be reworked or reseparated.

A further object of the invention is to provide a device for the purpose above specified which eliminates the use of separate conveyors and their elevators with their necessary attendant drives for recirculating the middlings of a pneumatic separator table or plant.

Another object of the invention is the provision of a device which improves the control of the separation on a pneumatic coal separating table by returning the middlings directly to the feed end of the table or bin of the table without passing them through intermediate hoppers or conveying units thereby materially reducing the handling or rehandling of the middlings.

A further object of the invention is the provision of an attachment which comprises a conveying chute which may be driven directly from the reciprocating deck of a pneumatic separator or may be driven by the reciprocating mechanism of the table.

A still further object of the invention is the provision of a reciprocating conveying trough or chute so mounted as to provide for the transportation of clean coal, middlings or refuse from a pneumatic separating table either in a horizontal direction or on an incline upward or downward, as desired.

Further novel features of construction and improved results and advantages of the invention will appear from the following specific description and accompanying drawings.

In the drawings:

Figure 1 is a view in side elevation of the improved apparatus applied to a pneumatic coal separating table.

Figure 2 is a top plan view of the apparatus.

Figure 3 is an end view showing the apparatus applied to a pneumatic coal separating table.

Figure 4 is an enlarged transverse vertical sectional view through one form of the trough, the toggle supporting arrangement of the trough being shown in full lines.

Figure 5 is an enlarged detail view in side elevation of the toggle supporting arrangement for the trough, the toggle plates being shown in vertical section.

Figure 6 is an enlarged transverse vertical sectional view through the conveying trough showing one form in which it is constructed.

Figure 7 is an enlarged transverse vertical sectional view through a modified form of conveying trough.

Figure 8 is a plan view showing a modified form of conveying trough as applied to a pneumatic coal separating table.

Figure 9 is a plan view of the chute toggle seat or plate.

Figure 10 is an end view of the chute toggle seat or plate.

Figure 11 is a transverse section of the line 11 of Figure 9, one end of the toggle being shown in position in its seat.

Figure 14 is a top plan view showing means for cutting out from the tailings the amount of refuse in the troughs.

Figure 15 is a side elevation looking from the outer side of the construction shown in Figure 14.

Figure 16 is an end view partly in section, looking at the rear end of the device shown in Figures 14 and 15.

Figure 17 is a transverse sectional view showing a different form of supporting rocking bearings for the elevating troughs on a line 17—17 of Figure 18 looking in the direction indicated by arrow.

Figure 18 is a side view of part of one of the elevating troughs showing one of the rocking bearings of Figure 17 and the supports for the lower end of the rocking bearings.

Figure 19 is a sectional view showing a modification in the manner of connecting the rods for reciprocating the elevating troughs.

Figure 20 is a modified construction of Figure 19.

Figure 12:
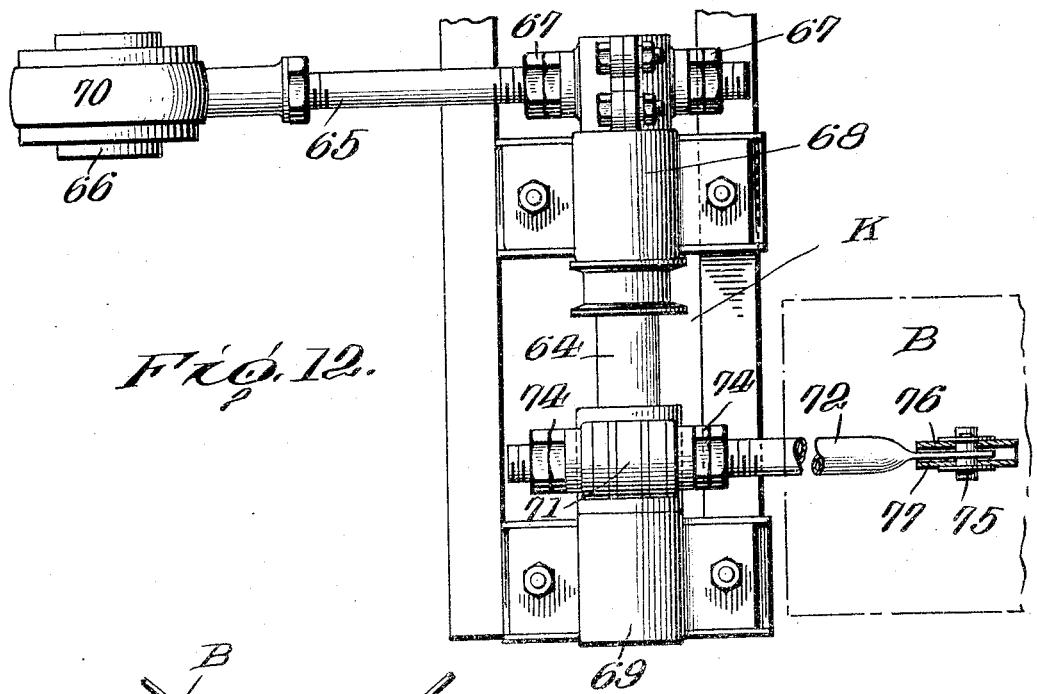
Figure 12 is a plan view of one form of driving connection for the chute.

In the drawings my improved middling chute attachment is illustrated as being attached to what is termed a Y type of apparatus for the separation of dry materials, which is particularly adapted for the separation of coal, though it can be used with other forms of separators.

This Y type of table is specifically described and illustrated in the H. M. Sutton et al. United States Patent No. 1,710,521 dated April 23, 1929 and entitled "Process and apparatus for the separation of dry materials" and for fuller description of the operation and specific construction of this type of table reference should be had to the specification of this patent, as in the present application the description of the table is treated with as briefly as possible.

The attachment as illustrated in the accompanying drawings is my preferred mechanical expression of my invention, but departures could be made therefrom without departing from the spirit of the invention and other uses could be made of the attachment than those specifically named by me herein.

Figure 13:
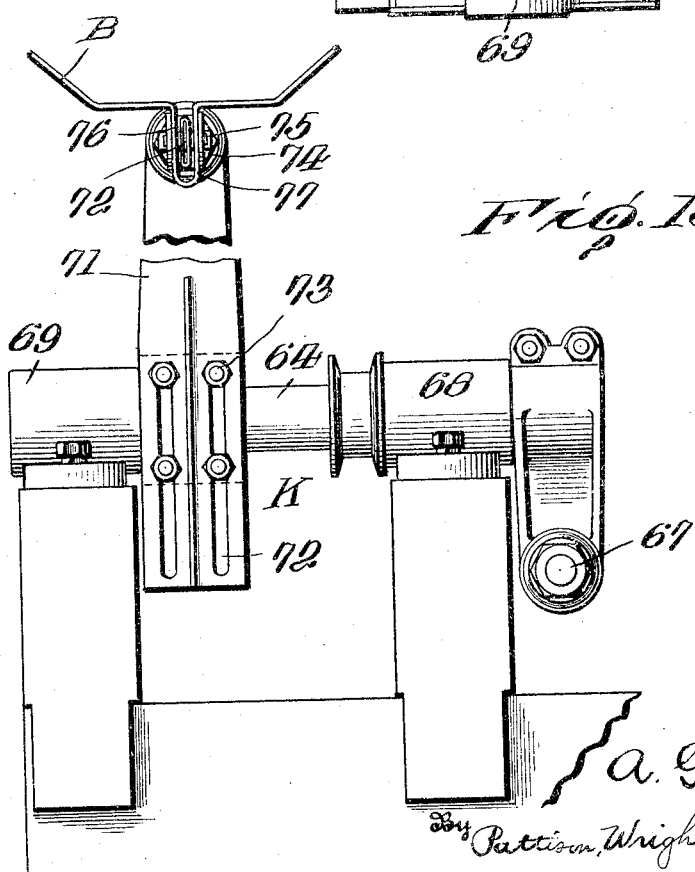
Figure 13 is a rear view of the driving mechanism illustrated in Figure 12.

The Y table is designated as an entirety by A, the two conveyor chutes or troughs extending longitudinally at the opposite sides of the table being designated as B and C while the discharge portions of the two chutes are designated as B' and C' respectively. The feed pan or bin of the table is designated as D, the table base as E and the table reciprocating drive as F. To aid in the specific description I have designated the chute toggles as G, the upper chute toggle seat or plate as H and the lower chute toggle seat or plate as J. In respect to the independent driving or reciprocating means for the chute as illustrated in Figures 12 and 13 I have designated this as K.

Describing the invention in detail it will be seen that the pneumatic coal separating table A is mounted on the base E upon toggle plates 16 which are normally inclined towards the receiving end of the table. These toggle plates extend transversely of the table and are of a suitable length to provide a substantial and durable rocking support for the table. Although it is not so shown, there is a fan and a suitable fan housing for delivering air to the table bed as is a common construction in respect to pneumatic separators.

The table reciprocating mechanism F is such that in operation the table raises upon its toggle mounting in a diagonal line on the forward stroke, falling back on the return stroke, whereby a differential reciprocating motion is imparted to the table. That is to say, the table is lifted in its forward motion and drops in its rearward motion, the toggle plates 16 being held against displacement by suitable springs 17.

Ordinarily in machines of this character the feed end of the table is lower than the discharge end and in some types of machines the separating deck has a transverse inclination in addition to the forward inclination towards the discharge end.

It is not necessary to go into details as to the operation of the separating machine other than to say that the deck is provided with riffles 18 and at either side of the deck are tailings riffles 19 and that the machine is termed a Y table because of the two arms 20 and 21 at the discharge end of the table. The particles passing off the end of the table at either side thereof at the points 22 and 23 of the arms when the table is acting as a coal concentrator, I term middlings and the present attachment is for the purpose of handling these middlings so that they are reworked or go through a second concentration on the table.

The previously mentioned two chutes or troughs B and C extend longitudinally at each side of the table and are so positioned that the middlings delivered at the points 22 and 23 of the table pass on to the lower ends 24 and 25 of the chutes. These chutes are closed at their lower ends by suitable end walls 27. As the feed pan or bin D of the table is quite deep to provide for capacity of material to be worked by the table, the ends 28 and 29 of the chutes are considerably elevated above the lower ends 24 and 25 of the chutes to make it possible for the chutes to deliver the middlings through their upper discharges B' and C' into the upper end of the pan of the table.

The chutes are supported upon the toggle arms G which are normally mounted at an inclination reverse to the inclination of the toggles supporting the table. That is to say, the inclination of the toggles supporting the chutes is towards the low end of the chutes and as a consequence when the chutes are reciprocated upon their toggle supports, as will be hereinafter described, the middlings are caused to travel upwardly in the chute for delivery to the feed end of the table. This traveling of the material is caused by the differential reciprocating motion which is imparted to the chutes. This differential reciprocating motion is similar to that imparted to the table with the result that the chutes are lifted towards their high ends and dropped when moved back to their opposite positions.

As will be apparent, the chute toggles G engage and are held in the seats 30 of the toggle plates J and the seats 31 of the toggle plates H (Figure 5) by reason of the two coil springs 32 mounted at each side of each of the toggles and which are fastened at their lower ends to the eye bolts 33 which pass through the opening 34 of the toggle plates J and at their upper ends to the depending horns 35 which are cast integral with and form a part of the toggle plates H and J.

By reference to Figure 4 of the drawings it will be seen that the toggle plates H are secured to the bottom 36 of each of the chutes by means of suitable bolts 37 while the toggle plates J are secured to the vertical standards 38 by means of the eye bolts 33. The vertical standards 38 are fastened as at 39 to the main base E and are braced by suitable longitudinally extending brace bars 40. These vertical standards 38 are of an inverted L-shape so that their horizontal leg portions 41 extend in a direction transverse the chutes to form a proper carrying member for the toggle plates H as most clearly appears in Figure 3 of the drawings.

Attention at this time might be called to the construction of the toggle plates H and J which are specifically illustrated in Figures 4, 5, 9, 10 and 11. Here it will be seen that the seat 30 in the toggle plate J is provided by forming integrally with the plate on one of its faces two humps or ridges 42 and 43 which extend in separated parallel relation longitudinally of the plate to form between them the rounded toggle seat 30.

The plate H has similar longitudinal extensions or humps 44 and 45 forming between them the rounded toggle seat 31 and additionally has at its ends the downwardly extending and integrally formed horns 35 to which the springs 32 are attached. Openings 46 are provided in this plate for the passage of the securing bolts 37.

The conveying troughs B and C are for handling middlings discharged from separators. By reference to Figure 6 it will be seen that these troughs have a flat bottom 36, sloping or inclined side walls 47 terminating in short vertical side walls 48 though they may have other cross sectional shapes. For the purpose of causing, when necessary, frictional engagement with the material being transported by the chutes the inner faces of the chutes are covered with rubber or fabric reinforcing coating 49, or wire mesh, which is secured at its upper ends 50 by suitable U-shaped moldings 51 which extend longitudinally to the upper edges of the vertical walls 48 of the chute. These moldings are held in place by suitable bolts 52.

When it is desired to handle the middlings from a separator working on finer sizes of coal, chute bottoms X and Y are used. Figure 8 of the drawings illustrates the use of bottoms X and Y in combination with a coal separating table and Figure 7 of the drawings illustrates in detail this modified form of chute construction. Here it will be seen that the bottoms 53 of the chutes or troughs are flat throughout the width of the troughs and terminate in vertical side walls 54. The troughs are provided (when necessary) with a secondary corrugated bottom R which is made up of a series of longitudinally extending V's 55. The secondary bottom R is provided at its sides with vertical extensions 56 which are secured by the longitudinal inwardly and downwardly bent edges 57 of the side walls 54 of the chutes.

For the purpose of illustration, two forms of drive are here shown. One drive is illustrated in Figure 1 of the drawings wherein it will be seen that rods 60 are connected as at 61 to the table and as at 62 to downwardly depending arms 63 from the bottom of the chutes. Suitable threaded portions and nuts carried by the shafts 60 make it possible to properly adjust the length of this arm to get the proper movement for the chutes or troughs.

In Figures 12 and 13 the second method of driving the chutes or troughs is illustrated wherein a driving mechanism K is provided. This driving mechanism comprises rocker shafts 64 which are driven by suitable rods 65 which rods are concentrically mounted and driven in any desired manner by the shaft 66 of the main table drive F. The shaft 64 is properly anchored and supported by suitable bearings 68 and 69.

By reason of the eccentric connection 70 of the rod 65 the shaft 64 is given a rocking motion and this rocking motion in turn imparts a longitudinal reciprocation to the troughs through the medium of the arms 71 and 72. The lower end of the arm 71 is slotted as at 72 and cooperating with these slots are headed bolts 73 to permit adjustable connection of the arm 71 to the shaft 64. The rod 72 has one end adjustably connected through the medium of suitable bolts 74 to the upper end of the arm 71 while its opposite end is pivotally connected as at 75 between the downwardly depending walls 76 and 77 formed integrally with the bottoms of the troughs or chutes.

In Figures 2, 14, 15 and 16 are shown means for making a cut or division of that portion of the tailings which is to form refuse and middlings. In some coals it is necessary that a larger cut of tailings be made to make up the middlings and refuse in order to prevent any tailings requiring retreatment from passing into the cleaned product. In some coals it is necessary that all the tailings be reworked in order to prevent loss of good coal, and in other coals it is desirable or necessary that a large part of the refuse passing over the lower end of the tailing bars 22 and 23 be not conveyed in the elevating troughs but allowed to pass through the bottom of the troughs to a refuse conveyor or place.

This is accomplished by forming in the lower extremity of the conveyor troughs B and C openings 24 and 25 and control the size of these openings by a sliding bottom $a$ in the trough, preferably in the manner here shown, though it may be supported in other ways.

In Figure 14 is disclosed a construction for controlling or regulating the amount of tailings that will flow as refuse and the amount of tailings which will fall in the troughs B and C and conveyed thereby to the feed end of the trough to be again worked over and the amount of coal contained in the tailings thus saved. This construction comprises a shelf member $b$ and the length of this shelf member is regulated by an adjustable plate $c$ which in effect is a part of the shelf $b$. This plate $c$ slides under the shelf $b$ and carries at its inner end a cutting finger $d$.

The shelf $b$ has its inner portion $e$ extending over the tailings bars and as shown in Figure 14 it is the tailings bar 23. This inner portion $e$ is secured to the tailings bar by suitable screw fastenings $f$. Also by reference to Figure 14 it will be observed that the inner portion $e$ has its inner end cut away as at $g$ and that the sliding place $c$ forms a continuation, so to speak, of the shelf $b$.

The operation of this special improvement is that the tailings flowing over the inner portion $e$ also flows over the shelf $b$ and its extension $c$, and that all of the tailings flowing over the parts $b$ and $c$ between the cutting finger $d$ and the lower end $h$ of the shelf flow into the lower end of the trough C. The size of the opening 25 of the trough C is regulated by the movable bottom $a$ which forms a continuation of the bottom of the said trough. This bottom is capable of movement back and forth in the lower end of the trough for the purpose of controlling the size of the opening 25 in the end of the trough. The position of the bottom $a$ is adjusted by a handle $a'$ and therefore controls the amount of tailings that will pass through the opening 25 and form the refuse. It will be understood from the foregoing that the position of the plate $c$ controls the position of the cutting finger $d$ carried by it and that this cutting finger controls the amount of tailings which will flow over the plate $c$ and shelf $b$ into the trough and that the position of the bottom $a$ controls the amount of the tailings which will pass through the opening 25 as refuse. In operation of this device the inner end $i$ of the bottom $a$ is substantially in a line with the cutting finger $d$.

All of the coal that flows over the tailings bar 23 falls through the opening $m$ that is between the inner edge of the trough C and the outer edge of the tailings riffle 23. Therefore when the plate $c$ is pulled inward substantially its limit this opening $m$ is elongated towards the lower end of the trough C and the deck A. I desire it understood that this device may be so constructed that the plate $c$ will move substantially through the length of the shelf $b$ and this shelf $b$ may be shortened to correspond with this adjustment, for instance, if substantially all of the tailings are to flow into the trough C and be conveyed to the feed end of the deck and be again worked for cleaning the coal therefrom. In normal operation however, the parts will be made in substantially the sizes shown in Figures 14, 15 and 16.

In Figure 14 the sliding bottom $a$ of the trough and the sliding plate $c$ controls the amount of tailings that is used as middlings and as refuse. The position of the plate $c$ is controlled by a suitable rod 85 connected therewith that is provided with a handle 90 and this rod is held in its adjusted position by a suitable clamp 88 that embraces the said rod and passes through an angle bar 86 and receives a wing nut 89.

In Figure 16 the movement of the coal and the tailings is illustrated. For instance $n$ illustrates the coal that falls through the space $m$ between the inner side of the trough C and the tailings riffle, while $p$ indicates the refuse that is passing over the shelf $b$ and the plate $c$ and falls through the opening 24 formed in the bottom of the trough and it constitutes the refuse.

A suitable receiving member $r$ is located under the opening $m$ to receive the coal passing through the said opening or space $m$ and from this receiving member $r$ the coal is conveyed to any suitable place. The plate $c$ has its inner end 82 turned downward between a holding member 84 that is attached to the outer side of the deck proper so that the movement of the turned down portion 82 of the plate moves back and forth while the outer edge of the plate is doubled inward as shown at 81. Thus the plate is held in its proper position as it moves back and forth for the purpose of controlling the amount of tailings that flow to the trough and the amount of refuse that falls through the opening 25 made in the trough. The refuse will of course be conveyed to any desired point after it falls through the opening 25.

In Figures 17 and 18 I show a different form of rocking supports for the elevating trough B. In this construction suitable bearings 91 are attached to the under side of the trough through which rods 92 pass and have their bearing. The said rods project beyond these bearings preferably as shown and on the ends are attached links 93 the lower ends of the links being supported by the projecting ends of a rod 94 that has its bearing in journals 95, which are suitably attached to supports 96 that are connected in any desired manner with the frame E on which the table A is supported. The above construction is simpler than that which has been heretofore described.

In Figures 19 and 20, I show modified forms of connecting the ends of the rods 60 with the elevating troughs. In the form shown in Figure 19 the end of the rod 60 is provided with adjustable screw threaded nuts 97 and between these adjustable nuts and the member 63 that extends downward from the under side of the troughs are suitable rubber members 98 which are located as shown at opposite sides of the member 63. The object of this is to form a flexible connection for the end of the rod 60 and by means of this flexible connection be able to adjust the amount of movement that is conveyed by the rod 60 to the said troughs. The flexibility is capable of adjustment as stated, whereby the relative amount of movement of the troughs and the table can be regulated by means of this flexibility. By this construction I am enabled to regulate the movement of the troughs so that their movement will be greater than the movement of the table. This is accomplished by adjusting the connection so that the flexibility is such that when the troughs are moved for instance in one direction their momentum will carry them beyond the movement of the said rod, and by tightening up the bolts to regulate this flexibility then the troughs can be made to move substantially the same distance as the table or deck, or made to have a greater movement than the table or deck.

The reason for this adjustability in the handling of the different grades of coal is that the refuse will be more or less. That is, some coal has less slate than others and where the tailings are of sufficient amount it is desirable to give the troughs an increased movement so that the tailings are elevated rapidly enough to prevent them from accumulating in the elevating troughs.

The above operation is accomplished by the construction shown in Figure 20. In this construction I substitute spiral springs 99 for the rubber elements 98. These springs 99 serve in the same way and act to accomplish the same purpose that has been described in respect to the elements 98.

Referring to the description specifically shown in Figures 12 and 13, it will be understood that the shaft 64 preferably may be made to extend entirely across the machine and each end be constructed like that shown in Figure 12. In that event only one eccentric 71 will be necessary to operate the shaft 64 which in turn operates both of the elevating troughs. On the other hand each trough may have a separate eccentric to work its own mechanism.

The method for adjusting the movement of the troughs shown in Figures 19 and 20 is especially needed when the troughs are operated directly by the movement of the table. By this it is meant that in the construction shown in Figure 1 the deck has its downwardly extending portion 100 to which the lower ends of the rod 60 are attached. In this case the table is reciprocated by the member F and the table in turn conveys this reciprocation to the troughs B and C through the rods which have their rear ends directly connected with the reciprocating table or deck and their forward ends directly connected with the said troughs. When this method of drive is being used some way of controlling the amount of reciprocation of the elevating troughs compared with the reciprocation of the table is desirable. In this event then the differential movement of the table and the troughs is provided by the flexible connections shown in Figures 19 and 20. It will also be understood that both ends of the rod 60 may have these flexible connections. That is to say, the lower end where it is connected to the table or deck may have this flexible connection and the upper ends where they are connected to the said troughs may have this flexible connection, or one end only may be flexibly connected.

When the device however is driven by the mechanism shown in Figure 12, then the differential movement between the troughs and the deck is accomplished as shown in Figures 12 and 13. In this construction as has been explained, the distance of the reciprocation of the troughs is controlled by lengthening or shortening the said lever 71 through the medium of its slots 72.

It will be understood from the foregoing description that I have devised means for providing each table with its own tailings receiving and elevating means whereby each table can take care of its tailings by reworking inasmuch as may be necessary to prevent any loss of coal.

The simpler method here disclosed is the one shown in Figure 1 though the method shown in Figures 12 and 13 may in some cases be more desirable.

It is desirable that the tailings conveyed for reworking be fed to the bottom of the coal that is fed to the deck A. In Figure 2 therefore, I have shown the upper ends of the troughs B and C extending around the feed pan D as illustrated at s, the edge t being cut out as shown at u whereby these tailings flow directly to the feed pan D. The idea of this is to if possible feed these tailings directly on the deck because the tailings naturally contain an enormously larger amount of slate than does the coal originally fed to the feed end of the deck. By feeding these tailings directly to the pan and therefore directly on the deck it avoids the slate contained in them sifting through the whole mass of coal being fed to the deck. In the separation of slate from coal, and especially in the type of table here shown, quite a large amount of the coal is separated from the slate before it moves far on the deck, and it is to avoid the mixing of these tailings with a large proportion of slate with the separated coal that the tailings be fed as nearly as practical at a point below this separated coal, or at a point in advance of the separation of this coal. By extending the troughs B and C around and embracing the feed end of the deck as here shown, and feeding the tailings directly to the feed end of the deck, or to the feed pan D, the mixing of these tailings with the separated coal is largely prevented.

In Figure 2 also I have shown in dotted lines $w$ the troughs extending inward over the feed end of the deck which has somewhat the effect just described, that is, the middlings are returned to near the feed pan D but it is not as effective for the purpose stated as is the feeding of the tailings on the feed pan D. The above result is best accomplished by feeding the original coal to the feed pan in advance somewhat of the point where the tailings also are deposited on the feed pan. Hence it is one step of our method of preventing the mixing of these tailings with the original coal to feed the tailings at the feed end of the deck, and to better effect this result is the step of feeding these tailings to the feed end of the deck in advance of the point at which substantially the original coal is fed to the deck.

I have described in considerable detail the foregoing constructions, but I wish it understood that I do not limit myself to the constructions shown since they may be varied by those skilled in the art without departing from the spirit of the present invention so long as the changed construction will come within a liberal interpretation of the appended claims without changing the substance of the invention.

Having thus described my invention what I claim and desire to secure by Letters Patent is:

1. In combination with a reciprocably mounted separating table for moving the material in one direction, a trough for receiving material from the discharge end of the table and carrying it to the opposite portion therefrom and discharging it upon the receiving end of the table, said trough being reciprocably mounted upon toggles, means for reciprocating the table, and interconnection between the table and the trough for reciprocating the trough and imparting a conveying and impelling movement to the material in the trough.

2. In combination with a reciprocable separating table having an upward inclination from its receiving to its discharge end and supported upon toggles inclined in a direction reverse to the inclination of the table, of a reciprocably mounted chute inclined reversely to the table and having its lower end adjacent to the discharge end of the table for receiving material therefrom, said chute mounted upon toggles inclined in a direction reverse to the inclination of the chute and reverse to the inclination of the toggles supporting the table, said chute receiving discharged material from the discharge end of the table and conveying it to the receiving end of the table to be reworked thereupon, and means for reciprocating both the table and the chute for moving the materials thereupon in directions reverse one to the other.

3. An ore working and cleaning apparatus comprising a reciprocably mounted concentrating table and means for reciprocating it, said table being of the Y type and having discharge at both sides of its discharge end, a pair of chutes one extending longitudinally at each side of the table and positioned to receive the discharge from its respective side of the table, said chutes being reciprocably mounted and provided with means to reciprocate them whereby the material in the chutes is conveyed along the chutes in a direction opposite that imparted by the reciprocation of said table, and said chutes discharging their contents on to the receiving end of the table so that the material received and conveyed by the chutes is reworked upon the concentrating table to effect a better separation thereof.

4. In combination with a reciprocable separating table having means for imparting the reciprocable motion thereto to convey material towards the discharge end of said table, a trough for receiving discharged material from the table and having its delivery end above the receiving end of the table for conveying said discharged material to the receiving end of the table for reworking thereon, said trough being reciprocably mounted, interconnecting means between the reciprocating drive of the table and the trough for imparting reciprocatory motion thereto, and said interconnecting means being adjustable whereby the stroke or reciprocation of the trough is variable in respect to the reciprocation of the table.

5. The combination with a reciprocating separating deck of a reciprocating tailings receiving trough mounted independently of said deck, said table and trough moving up and down in their reciprocation, the trough moving up when the table moves downward whereby the tailings are conveyed by the trough from the delivery end of the table to its receiving end.

6. The combination with a reciprocating separating table of a tailings receiving element having its receiving end located at the delivery end of the table and its opposite delivery end located at the feed end of the table, means connecting the said table and element to cause the latter to reciprocate with the table, said means being flexible whereby the amount of movement of said element is made different from the amount of movement of the table.

7. The combination with a reciprocating separating table having a reciprocating means of an elevating trough extending from the delivery end of the table to the feed end thereof, a connection between the said trough and the table reciprocating means, said connection having an adjustable flexible means whereby the amount of movement of the trough in respect to the amount of movement of the table can be regulated.

8. A separating apparatus comprising a separating deck, a receiver located outside of the said deck and extending from its delivery end to its receiving end, said receiver constructed to form a space between it and the deck for the passage of coal, a shelf extending from the deck over the receiver, said shelf being longitudinally adjustable for the purpose described, and the receiver having an adjustable longitudinal opening for the purpose described, the parts combined and operating as set forth.

9. A separating apparatus comprising a separating deck, a receiver located outside of the deck and extending from its delivery to its receiving end, the receiver constructed to form a space between it and the deck for the passage of coal, a shelf cooperating with the deck and extending across the said space, the said receiver having an adjustable refuse opening whereby the refuse and tailings passing over the shelf may be proportioned.

10. A dry coal separator and the like comprising a pervious reciprocating deck through which air is forced upwardly whereby the heavy particles of the mass are separated from the lighter particles said deck having a middlings discharge and a reciprocating member having its receiving end located to receive the said middlings and extending in a line upwardly and delivering the said middlings to the said deck, and means for imparting a reciprocating and up and down movement for imparting a step by step movement to the middlings causing them to be delivered to the said deck for reworking.

11. An apparatus for the dry cleaning of coal and the like comprising a pervious reciprocating deck having a middlings discharge, a middlings receiving member having its receiving end located to receive the said middlings and extending upwardly having its discharge end extending laterally to deliver the middlings to the deck for reworking, said middlings member mounted to be longitudinally reciprocated and to be vertically reciprocated for imparting a movement to the middlings and delivering it to the deck for reworking.

12. An apparatus for the dry separation of coal comprising a longitudinally reciprocating pervious deck adapted to receive the mass of coal, a reciprocating middlings receiving member having its receiving end located approximately at the discharge end of the deck for receiving the middlings therefrom, said member inclined upwardly towards the opposite end of said deck to deliver the middlings to the deck for reworking and means adapted to impart a longitudinal and up and down movement to the middlings receiving member whereby the middlings are projected throughout the length of the receiving member and deposited on the said deck for reworking.

13. An apparatus for the dry cleaning of coal comprising a longitudinally extending and longitudinally reciprocating pervious deck constructed to deliver the separated coal and middlings at each side of the deck, of middlings receiving members located at and extending longitudinal each side of said deck, said members having their receiving ends located approximately at the discharge end of the deck to receive middlings therefrom, said members mounted to longitudinally and vertically reciprocate, means for imparting both reciprocations thereto, said middlings receiving members extending inwardly toward the center of the deck and depositing the middlings thereon to be reworked.

14. An apparatus for improving the control of the separation of coal on a pneumatic separating table, comprising a separating table, a reciprocating chute for receiving the middlings discharge of the table, the delivery end of the chute extending above the receiving end of said table and conveying the middlings to the receiving end of the table for reworking, said chute being mounted upon toggles and reciprocated by the reciprocation of the separating table to impart conveying movement to the middlings in the chute.

In testimony whereof I hereunto affix my signature.

ALWYN G. OPPY.